United States Patent
Mehta et al.

(10) Patent No.: US 10,291,497 B2
(45) Date of Patent: May 14, 2019

(54) SESSION-BASED TRAFFIC STATISTICS LOGGING FOR VIRTUAL ROUTERS

(71) Applicant: Juniper Networks, Inc., Sunnyvale, CA (US)

(72) Inventors: Anish Mehta, Fremont, CA (US); Arvind Batalagundu Viswanathan, San Jose, CA (US); Megh P. Bhatt, Dublin, CA (US); Ashok Singh R., Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 68 days.

(21) Appl. No.: 15/476,136

(22) Filed: Mar. 31, 2017

(65) Prior Publication Data

US 2018/0287905 A1 Oct. 4, 2018

(51) Int. Cl.
*H04L 12/26* (2006.01)
*H04L 12/24* (2006.01)
(Continued)

(52) U.S. Cl.
CPC ........ *H04L 43/062* (2013.01); *H04L 12/4641* (2013.01); *H04L 41/046* (2013.01);
(Continued)

(58) Field of Classification Search
CPC ... H04L 43/028; H04L 47/2483; H04L 63/20; H04L 63/0421; H04L 45/66; H04L 12/26;
(Continued)

(56) References Cited

U.S. PATENT DOCUMENTS 7,508,764 B2 * 3/2009 Back .................. H04L 43/00
  370/235
7,739,330 B1 * 6/2010 Shafer ............... G06Q 30/0277
  705/14.73

(Continued)

FOREIGN PATENT DOCUMENTS

WO 2013184846 A1 12/2013

OTHER PUBLICATIONS

Boschi, et al., "Bidirectional Flow Measurement, IPFIX, and Security Analysis," Oct. 2006, 4 pp.
(Continued)

*Primary Examiner* — Man U Phan
(74) *Attorney, Agent, or Firm* — Shumaker & Sieffert, P.A.

(57) ABSTRACT

Techniques are disclosed for session-based traffic statistics. In an example method, a virtual router of a cloud data center processes traffic flows for virtual machines executing on a server within the cloud data center to generate traffic flow statistics. The traffic flows include ingress traffic flows originating from the virtual machines and destined for a network of the cloud data center, and egress traffic flows originating from the network of the cloud data center and destined for the virtual machines. A virtual routing agent processes the traffic flow statistics to identify pairs of ingress and egress traffic flows corresponding to a common communication session. The virtual routing agent generates, for each identified pair of ingress and egress traffic flows, session records comprising traffic session statistics for each of the ingress and egress traffic flows of the pair and uploads the session records to a traffic collector for the network.

23 Claims, 8 Drawing Sheets

(51) Int. Cl.
*H04L 12/851* (2013.01)
*H04L 12/46* (2006.01)
*H04L 12/771* (2013.01)
*H04L 12/741* (2013.01)
*H04L 29/12* (2006.01)

(52) U.S. Cl.
CPC ............ *H04L 41/142* (2013.01); *H04L 45/56* (2013.01); *H04L 45/745* (2013.01); *H04L 47/2441* (2013.01); *H04L 47/2483* (2013.01); *H04L 43/04* (2013.01); *H04L 43/0876* (2013.01); *H04L 43/50* (2013.01); *H04L 61/6068* (2013.01)

(58) Field of Classification Search
CPC ..... H04L 45/124; H04L 45/306; H04L 45/38; H04B 10/27
USPC .................................................. 370/252, 236
See application file for complete search history.

(56) References Cited

U.S. PATENT DOCUMENTS

| | | | |
|---|---|---|---|
| 8,331,234 B1 | 12/2012 | Newton et al. | |
| 9,014,034 B2* | 4/2015 | Frey | H04L 43/026 370/252 |
| 9,413,634 B2* | 8/2016 | Nadeau | H04L 45/124 |
| 9,641,435 B1 | 5/2017 | Sivaramakrishnan | |
| 9,755,960 B2* | 9/2017 | Moisand | H04L 12/4633 |
| 9,787,559 B1* | 10/2017 | Schroeder | H04L 41/5038 |
| 9,898,317 B2* | 2/2018 | Nakil | G06F 9/45558 |
| 9,985,849 B2* | 5/2018 | Mihelich | H04L 63/0421 |
| 2009/0238088 A1* | 9/2009 | Tan | H04L 41/0631 370/252 |
| 2015/0281007 A1* | 10/2015 | Mihelich | H04L 63/0421 726/1 |
| 2016/0050132 A1* | 2/2016 | Zhang | H04L 29/08153 370/252 |

OTHER PUBLICATIONS

Boschi, et al., "Bidirectional Flow Measurement, IPFIX, and Security Analysis," FloCon 2006, Oct. 10, 2006, 12 slides.
Minarik, et al., "Improving Host Profiling with Bidirectional Flows," 2009 International Conference on Computational Science and Engineering, Aug. 2009 IEEE, pp. 231-237.
Hoops, "Analysis of an Equal-Cost Multi-Path Algorithm," Network Working Group, RFC 2992, Nov. 2000, 8 pp.

* cited by examiner

| T2 | Source VN | Source IP | T1 | Value |
|---|---|---|---|---|
| 10101010 | VN1 | IP1 | 1111111 | ING = A, EGR = B, FWD Flag = T/F |
| 10101010 | VN2 | IP2 | 1111111 | ING = C, EGR = D, FWD Flag = T/F |

| T2 | Dest VN | Dest IP | T1 | Value |
|---|---|---|---|---|
| 10101010 | VN2 | IP2 | 1111111 | ING = A, EGR = B, FWD Flag = T/F |
| 10101010 | VN1 | IP1 | 1111111 | ING = C, EGR = D, FWD Flag = T/F |

SESSION-BASED TRAFFIC STATISTICS LOGGING FOR VIRTUAL ROUTERS

TECHNICAL FIELD

This disclosure generally relates to computer networks and, in particular, to collecting and logging traffic statistics within computer networks.

BACKGROUND

In general, a network analyzer is a device used to sample traffic flows in a network. For example, a network analyzer may capture data from the network, and generate traffic flow statistics indicative of the traffic flow in the network. The network analyzer may locally store the traffic flow statistics, but more often, the network analyzer communicates the traffic flow statistics to another network device, referred to as packet flow collector, that can be used by a network administrator to examine traffic flows through the entire network. Specifically, the network analyzer generates traffic flow packets that include the accumulated statistics, i.e., the traffic flow information, for individual packet flows of the sampled network. In many network environments, the traffic flow collector may receive traffic flow information via traffic flow packets sent from various network locations. Consequently, a network administrator can use the packet flow collector to analyze overall network traffic flow.

Conventional network analyzers comprise dedicated computers that extract traffic flow information from packets being sent between routers or other devices in the network. In addition, a network router, switch, hub, or other device, may include traffic analysis functions to generate traffic flow packets based on the traffic flow that occurs through the device. In either case, the network analyzers typically compute traffic flow information, and generate traffic flow packets to communicate the traffic flow information to the packet flow collector. The information generated by network analyzers and contained in the traffic flow packets may be used to improve network planning, traffic engineering, network monitoring, usage-based billing and the like. In addition, the information contained in the traffic flow packets may be used to identify denial of service (DoS) attacks, or other network events related to network security.

Conventional network analyzers perform sampling of the network and compute traffic flow information over a period of time, and then send a large collection of traffic flow packets to the packet flow collector. For example, network analyzers may accumulate flow statistics into a database or other data structure and, upon expiration of a defined period or upon collecting a defined amount of data, transmit all of the flow information in a burst of traffic flow packets. This burst of traffic flow packets may consume significant network bandwidth, and may overload or otherwise burden the packet flow collector. These effects may be more noticeable in network environments having multiple network analyzers.

SUMMARY

In general, the disclosure describes techniques for performing session-based monitoring and logging of network flow and traffic statistics. As described herein, a virtual router of a forwarding component operating within a host of a cloud data center performs routing services for one or more virtual network functions of the cloud data center, such as forwarding network traffic between an originator and a destination for the network traffic. The virtual router processes both ingress and egress flows of network traffic forwarded by the virtual router to generate network flow statistics. The network flow statistics may include metrics such as bandwidth consumption, traffic routing and pathing, and application use.

The virtual router communicates the network flow statistics to a virtual routing (VR) agent of a forwarding component executing on the host and associated with the virtual router. The VR agent of the forwarding component processes the ingress flows and egress flows to identify pairs of the ingress and egress flows corresponding to a common communication session between the virtual network functions. For each identified pair, the VR agent generates session-based records of traffic statistics for the network traffic forwarded by the virtual router. The VR agent uploads the session-based records to a traffic collector of a Software-defined Networking (SDN) controller for the cloud data center. The traffic collector receives session-based records from a plurality of VR agents and stores these session-based records in an analytics database for use by an administrator of the cloud data center. The administrator may use such metrics to assist in detecting and diagnosing network performance issues of the cloud data center.

Such techniques may be particularly useful in virtual environments where, for example, a virtual router may be deployed on each physical host. For example, such a system as described herein may require fewer index tables to store the network flow statistics and traffic monitoring information, and thus require fewer write operations to record traffic statistics for each network session than a system that records traffic statistics on a per-flow basis. Thus, such a system for performing session-based monitoring and logging of network flow and traffic statistics may operate more efficiently and quickly than if traffic statistics were performed on a per-flow basis alone.

In one example, this disclosure describes a method including: processing, by a virtual router executing on a processor of a server within a cloud data center, a plurality of traffic flows for one or more virtual machines executing on the server within the cloud data center to generate traffic flow statistics, wherein the plurality of traffic flows include: a plurality of ingress traffic flows originating from the one or more virtual machines and destined for a network of the cloud data center; and a plurality of egress traffic flows originating from the network of the cloud data center and destined for the one or more virtual machines; processing the traffic flow statistics to identify pairs of the plurality of ingress traffic flows and the plurality of egress traffic flows corresponding to a common communication session for the one or more virtual machines; generating, for each of the identified pairs of the plurality of ingress traffic flows and the plurality of egress traffic flows, session records including traffic session statistics for the respective one of the plurality of ingress traffic flows and the respective one of the plurality of egress traffic flows of the pair; and uploading the session records to a traffic collector for the network of the cloud data center.

In another example, this disclosure describes a method including: receiving, by a traffic collector for a network of a cloud data center and from a virtual routing agent executing on a processor of a server within the cloud data center, session records including traffic session statistics for pairs of traffic flows that correspond to a common communication session for the one or more virtual machines, and wherein the traffic session statistics for each of the pairs of traffic flows for the session records includes traffic session statistics for an ingress traffic flow originating from one or more virtual machines and destined for a network of the cloud data center, and traffic session statistics for an egress traffic flow originating from the network of the cloud data center and destined for the one or more virtual machines; and storing, by the traffic collector, the session records in an analytics database.

In another example, this disclosure describes a forwarding component executing on a processor of a server within a cloud data center configured to: process, by a virtual router of the forwarding component, a plurality of traffic flows for one or more virtual machines executing on the server within the cloud data center to generate traffic flow statistics, wherein the plurality of traffic flows include: a plurality of ingress traffic flows originating from the one or more virtual machines and destined for a network of the cloud data center; and a plurality of egress traffic flows originating from the network of the cloud data center and destined for the one or more virtual machines; process the traffic flow statistics to identify pairs of the plurality of ingress traffic flows and the plurality of egress traffic flows corresponding to a common communication session for the one or more virtual machines; generate, for each of the identified pairs of the plurality of ingress traffic flows and the plurality of egress traffic flows, session records including traffic session statistics for the respective one of the plurality of ingress traffic flows and the respective one of the plurality of egress traffic flows of the pair; and upload the session records to a traffic collector for the network of the cloud data center.

In another example, this disclosure describes a traffic collector for a network of a cloud data center configured to: receive, from a forwarding component executing on a processor of a server within the cloud data center, session records including traffic session statistics for pairs of traffic flows that correspond to a common communication session for the one or more virtual machines, and wherein the traffic session statistics for each of the pairs of traffic flows for the session records includes traffic session statistics for an ingress traffic flow originating from one or more virtual machines and destined for a network of the cloud data center, and traffic session statistics for an egress traffic flow originating from the network of the cloud data center and destined for the one or more virtual machines; and store the session records in an analytics database.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

FIGS. 7A-7B are block diagrams of an example source index table and an example destination index table for a database for storing session-based traffic statistics in accordance with the techniques of the disclosure.

Like reference characters refer to like elements throughout the figures and description.

DETAILED DESCRIPTION

Figure 1:
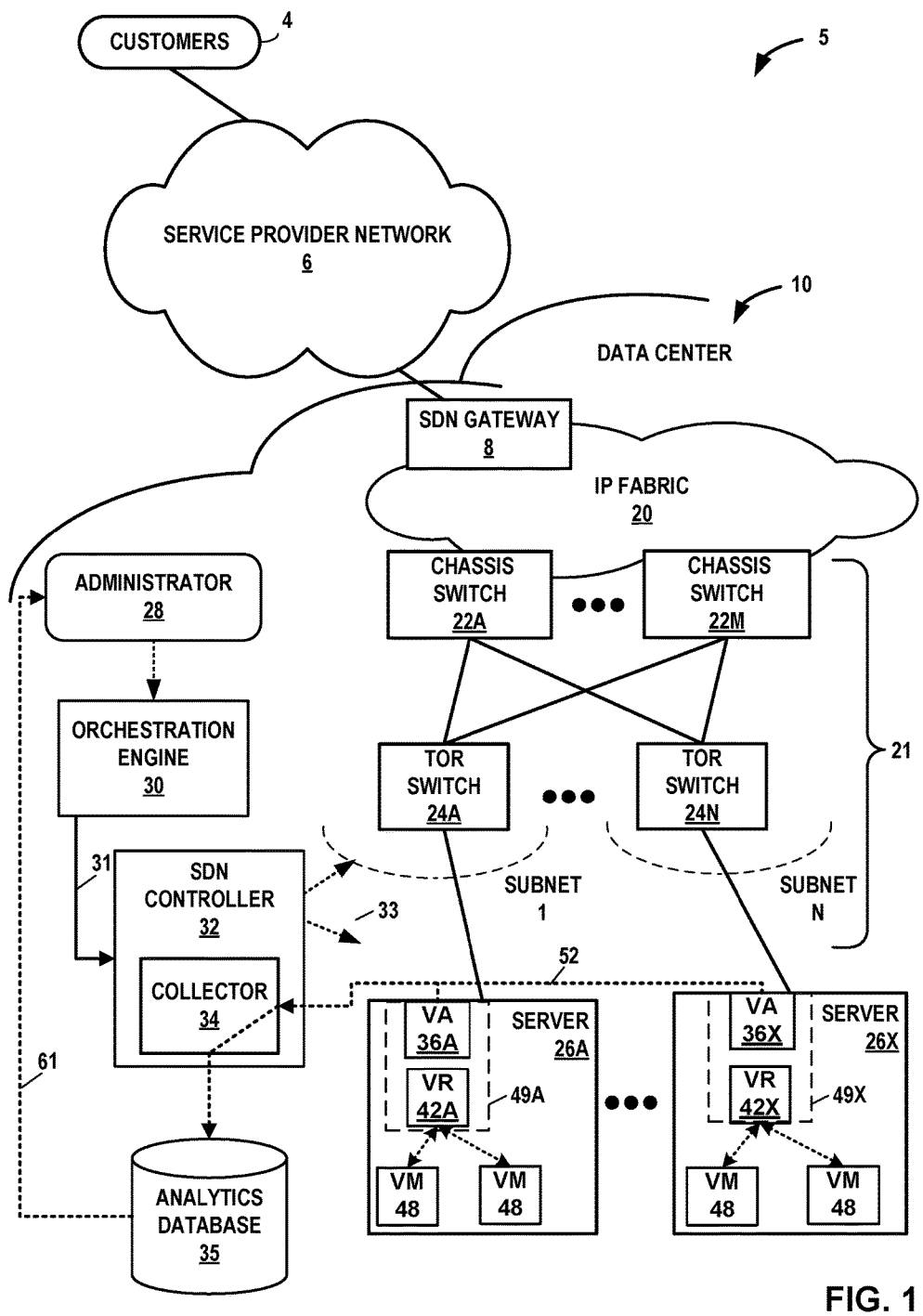
FIG. 1 is a block diagram illustrating an example network having a data center in which examples of the techniques described herein for performing session-based monitoring and logging of network flow and traffic statistics may be implemented.

FIG. 1 is a block diagram illustrating an example network 5 having a data center 10 in which examples of the techniques described herein for performing session-based monitoring and logging of network flow and traffic statistics may be implemented.

In general, data center 10 provides an operating environment for applications and services for customers 4 coupled to the data center 10 by service provider network 6. Data center 10 hosts infrastructure equipment, such as networking and storage systems, redundant power supplies, and environmental controls. In some examples, data center 10 includes clusters of storage systems and application servers are interconnected via high-speed switch fabric provided by one or more tiers of physical network switches and routers. In more sophisticated examples, data center 10 provides infrastructure spread throughout the world with subscriber support equipment located in various physical hosting facilities. Service provider network 6 may be coupled to one or more networks administered by other providers, and may thus form part of a large-scale public network infrastructure, e.g., the Internet.

In some examples, data center 10 may represent one of many geographically distributed network data centers. As illustrated in the example of FIG. 1, data center 10 is a facility that provides network services for customers 4. Customers 4 may be collective entities such as enterprises and governments or individuals. For example, a network data center may host web services for several enterprises and end users. Other exemplary services may include data storage, virtual private networks, traffic engineering, file service, data mining, scientific- or super-computing, and so on. In some examples, data center 10 is an individual network server, a network peer, or otherwise.

In this example, data center 10 includes a set of storage systems and application servers interconnected via high-speed switch fabric 21 provided by one or more tiers of physical network switches and routers. Servers 26 function as compute nodes of the data center. In some examples, the terms "compute nodes" and "servers" are used interchangeably herein to refer to servers 26. For example, each of servers 26 may provide an operating environment for execution of one or more customer-specific virtual machines ("VMs" in FIG. 1). Switch fabric 21 is provided by a set of interconnected top-of-rack (TOR) switches 24A-24N (collectively, "TOR switches 24") coupled to a distribution layer of chassis switches 22A-22M (collectively, "chassis switches 22"). Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In this example, TOR switches 24 and chassis switches 22 provide servers 26 with redundant (multi-homed) connectivity to IP fabric 20. Chassis switches 22 aggregate traffic flows and provides high-speed connectivity between TOR switches 24. TOR switches 24 are network devices that provide layer two (e.g., MAC) and/or layer 3 (e.g., IP) routing and/or switching functionality. TOR switches 24 and chassis switches 22 each include one or more processors and a memory, and that are capable of executing one or more software processes. Chassis switches 22 are coupled to IP fabric 20, which performs layer 3 routing to route network traffic between data center 10 and customers 4 by service provider network 6. Software-Defined Network ("SDN") gateway 8 acts to forward and receive packets between IP fabric 20 and service provider network 6.

Software Defined Networking (SDN) platforms may be used in data center 10 to control and manage network behavior. In some cases, an SDN platform includes a logically centralized and physically distributed SDN controller, such as SDN controller 32, and a distributed forwarding plane in the form of virtual routers that extend the network from physical routers and switches in the data center switch fabric into a virtual overlay network hosted in virtualized servers.

SDN controller 32 provides management, control, and analytics functions of a virtualized network and orchestrates the virtual routers. In other words, SDN controller 32 provides a logically and in some cases physically centralized controller for facilitating operation of one or more virtual networks within data center 10 in accordance with one or more examples of this disclosure. The terms SDN controller and Virtual Network Controller ("VNC") may be used interchangeably throughout this disclosure. In some examples, SDN controller 32 operates in response to configuration input received from orchestration engine 30 via northbound Application Programming Interface (API) 31, which in turn operates in response to configuration input received from administrator 28. Additional information regarding SDN controller 32 operating in conjunction with other devices of data center 10 or other software-defined network is found in International Application Number PCT/US2013/044378, filed Jun. 5, 2013, and entitled PHYSICAL PATH DETERMINATION FOR VIRTUAL NETWORK PACKET FLOWS, which is incorporated by reference as if fully set forth herein.

In some examples, orchestration engine 30 manages functions of data center 10 such as compute, storage, networking, and application resources. For example, orchestration engine 30 may create a virtual network for a tenant within data center 10 or across data centers. Orchestration engine 30 may attach virtual machines (VMs) to a tenant's virtual network. Orchestration engine 30 may connect a tenant's virtual network to some external network, e.g. the Internet or a VPN. Orchestration engine 30 may implement a security policy across a group of VMs or to the boundary of a tenant's network. Orchestration engine 30 may deploy a network service (e.g. a load balancer) in a tenant's virtual network.

In some examples, SDN controller 32 manages the network and networking services such load balancing, security, and allocate resources from servers 26 to various applications via southbound API 33. That is, southbound API 33 represents a set of communication protocols utilized by SDN controller 32 to make the actual state of the network equal to the desired state as specified by orchestration engine 30. One such communication protocol may include a messaging communications protocol such as XMPP, for example. For example, SDN controller 32 implements high-level requests from orchestration engine 30 by configuring physical switches, e.g. TOR switches 24, chassis switches 22, and switch fabric 21; physical routers; physical service nodes such as firewalls and load balancers; and virtual services such as virtual firewalls in a VM. SDN controller 32 maintains routing, networking, and configuration information within a state database. SDN controller 32 communicates a suitable subset of the routing information and configuration information from the state database to virtual router (VR) agents 26A-26X ("VA" in FIG. 1) on each of servers 26A-26X.

Typically, the traffic between any two network devices, such as between network devices within IP fabric 20 (not shown) or between servers 26 and customers 4 or between servers 26, for example, can traverse the physical network using many different paths. For example, there may be several different paths of equal cost between two network devices. In some cases, packets belonging to network traffic from one network device to the other may be distributed among the various possible paths using a routing strategy called multi-path routing at each network switch node. For example, the Internet Engineering Task Force (IETF) RFC 2992, "Analysis of an Equal-Cost Multi-Path Algorithm," describes a routing technique for routing packets along multiple paths of equal cost. The techniques of RFC 2992 analyze one particular multipath routing strategy involving the assignment of flows to bins by hashing packet header fields that sends all packets from a particular network flow over a single deterministic path.

For example, a "flow" can be defined by the five values used in a header of a packet, or "five-tuple," i.e., the protocol, Source IP address, Destination IP address, Source port, and Destination port that are used to route packets through the physical network. For example, the protocol specifies the communications protocol, such as TCP or UDP, and Source port and Destination port refer to source and destination ports of the connection. A set of one or more packet data units (PDUs) that match a particular flow entry represent a flow. Flows may be broadly classified using any parameter of a PDU, such as source and destination data link (e.g., MAC) and network (e.g., IP) addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port.

As described herein, each of servers 26 include a respective forwarding component 49A-49X (hereinafter, "forwarding components 49) that performs data forwarding and traffic statistics functions for virtual machines ("VMs 48" of FIG. 1) executing on each server 26. In the example of FIG. 1, each forwarding component is described as including a virtual router ("VR 42A-VR42X" in FIG. 1) that executes within a hypervisor of server 26 to perform packet routing and overlay functions, and a VR agent ("VA 36A-36X" in FIG. 1) that executes within user space of server 26 to communicate with SDN controller 32 and, in response, configure virtual router 40. As described herein, in this example, virtual router 40 performs real-time traffic monitoring and statistics generation based on traffic routed between the virtual machines 48 and the data center switch fabric 21. VR agent operates to collect, aggregate and report the statistics to collector 34 of SDN controller. The example of FIG. 1, in which each of forwarding components 49 includes a VR agent 36 separate from a virtual router 42, is shown for illustration purposes only. In other examples, some or all of the functionality of VR agent 36 may be integrated within virtual router 40 such that virtual agent 36 is not required.

In this example, each virtual router 42 of forwarding component 49 executes multiple routing instances for corresponding virtual networks within data center 10 and routes the packets to appropriate virtual machines executing within the operating environment provided by the servers. Packets received by the virtual router of server 26A, for instance, from the underlying physical network fabric may include an outer header to allow the physical network fabric to tunnel the payload or "inner packet" to a physical network address for a network interface of server 26 that executes the virtual router. The outer header may include not only the physical network address of the network interface of the server but also a virtual network identifier such as a VxLAN tag or Multiprotocol Label Switching (MPLS) label that identifies one of the virtual networks as well as the corresponding routing instance executed by the virtual router. An inner packet includes an inner header having a destination network address that conform to the virtual network addressing space for the virtual network identified by the virtual network identifier.

In some aspects, the virtual router buffers and aggregates multiple tunneled packets received from the underlying physical network fabric prior to delivery to the appropriate routing instance for the packets. That is, a virtual router of a forwarding component executing on one of servers 26 may receive inbound tunnel packets of a packet flow from TOR switches 24 and, prior to routing the tunnel packets to a locally executing virtual machine, process the tunnel packets to construct a single, aggregate tunnel packet for forwarding to the virtual machine. That is, the virtual router may buffer multiple inbound tunnel packets and construct the single, tunnel packet in which the payloads of the multiple tunnel packets are combined into a single payload and the outer/overlay headers on the tunnel packets are removed and replaced with a single header virtual network identifier. In this way, the aggregate tunnel packet can be forwarded by the virtual router to the virtual machine as if a single inbound tunnel packet was received from the virtual network. Moreover, to perform the aggregation operation, the virtual router may leverage a kernel-based offload engine that seamlessly and automatically directs the aggregation of tunnel packets. Further example techniques by which the virtual routers forward traffic to the customer-specific virtual machines executing on servers 26 are described in U.S. patent application Ser. No. 14/228,844, entitled "PACKET SEGMENTATION OFFLOAD FOR VIRTUAL NETWORKS," incorporated herein by reference.

In the example of FIG. 1, SDN controller 32 learns and distributes routing and other information (such as configuration) to all compute nodes in the data center 10. The VR agent 36 of a forwarding component 49 running inside the compute node, upon receiving the routing information from SDN controller 32, typically programs the data forwarding element (virtual router 42) with the forwarding information. SDN controller 32 sends routing and configuration information to the VR agent 36 using a messaging communications protocol such as XMPP protocol semantics rather than using a more heavy-weight protocol such as a routing protocol like BGP. In XMPP, SDN controllers 32 and agents communicate routes and configuration over the same channel. SDN controller 32 acts as a messaging communications protocol client when receiving routes from a VR agent 36, and the VR agent 36 acts as a messaging communications protocol server in that case. Conversely, SDN controller 32 acts as a messaging communications protocol server to the VR agent 36 as the messaging communications protocol client when the SDN controller sends routes to the VR agent 36.

According to the techniques of the disclosure, system 5 performs session-based sampling and logging of network flow and traffic statistics. Virtual routers 42 of forwarding components 49 perform routing services for one or more virtual network functions executing on virtual machines 48 of services 26, such as forwarding network traffic between an originator of the network traffic and a destination for the network traffic. Virtual routers 42 processes both ingress and egress flows of network traffic forwarded by each virtual router 42 to generate network flow statistics. The network flow statistics may include metrics such as bandwidth consumption, traffic routing and pathing, and application use.

Each virtual router 42 communicates the network flow statistics to a corresponding VR agent 36 of forwarding component 49. Each VR agent 42 processes the network flow statistics for the ingress flows and egress flows to identify pairs of the ingress and egress flows corresponding to a common communication session between VMs 48. For each identified pair, VR agent 42 generates session-based records of traffic statistics for the network traffic forwarded by virtual router 42. VR agent 42 uploads the session-based records to traffic collector 34 of SDN controller 32 for cloud data center 10. Traffic collector 34 receives session-based records from a plurality of VR agents 42 and stores these session-based records in analytics database 35 for use by an administrator 28 of cloud data center 10. The administrator 28 may access such metrics via an interface 61 to assist in detecting and diagnosing network performance issues of the cloud data center. In some examples, a network analyzer analyses session-based records stored within analytics database 25 and presents network analytics to administrator 28 via a dashboard visualization.

Such techniques may be particularly useful in virtual environments such as the example data center 10 of FIG. 1, where, for example, at least one virtual router 42 is deployed on each physical host 26. Such a system as described herein may require fewer index tables within analytics database 35 to store the network flow statistics and traffic monitoring information, and thus require fewer write operations to record the information for each network session than a system that records traffic statistics on a per-flow basis. Thus, such a system for performing session-based monitoring and logging of network flow and traffic statistics may operate more efficiently and quickly than if traffic statistics were performed on a per-flow basis alone.

Figure 2:
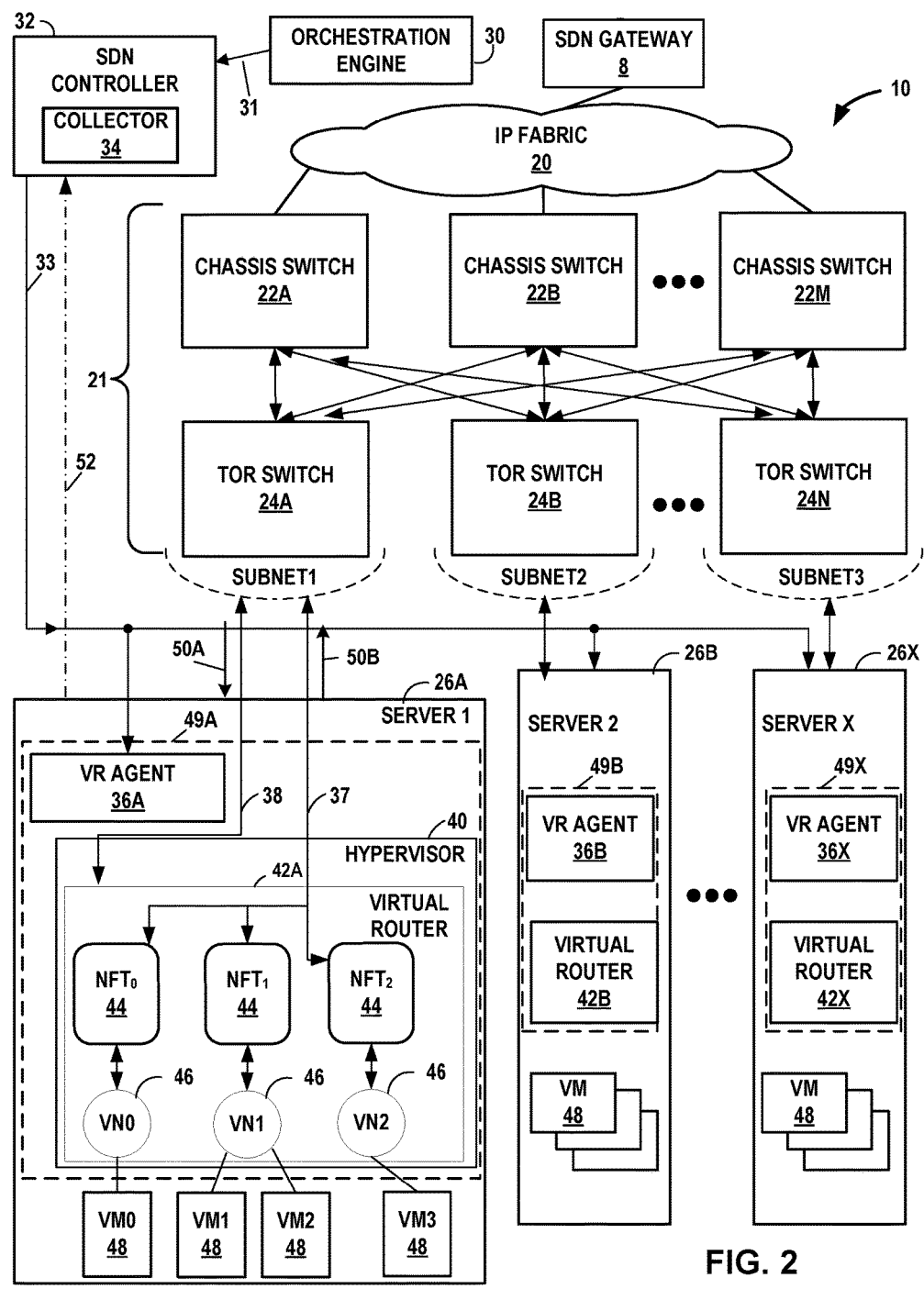
FIG. 2 is a block diagram illustrating an example implementation of the data center of FIG. 1 in further detail.

FIG. 2 is a block diagram illustrating an example implementation of data center 10 of FIG. 1 in further detail. In the example of FIG. 2, data center 10 includes an overlay network that extends switch fabric 21 from physical switches 22, 24 to software or "virtual" switches 42A-42X (collectively, "virtual routers 42") of forwarding components 49A-49X (collectively, "forwarding components 49"). Responsive to instructions received from SDN controller 32, virtual routers 42 of forwarding components 49 dynamically create and manage one or more virtual networks 46 usable for communication between application instances.

In one example, virtual routers 42 execute the virtual network as an overlay network, which provides the capability to decouple an application's virtual address from a physical address (e.g., IP address) of the one of servers 26A-26X ("servers 26") on which the application is executing. Each virtual network may use its own addressing and security scheme and may be viewed as orthogonal from the physical network and its addressing scheme. Various techniques may be used to transport packets within and across virtual networks 46 over the physical network.

Each of virtual routers 42A-42X ("virtual routers 42") executes within a hypervisor, a host operating system, or other component of each of servers 26. Each of servers 26 represents an x86 or other general-purpose or special-purpose server capable of executing virtual machines 48. In the example of FIG. 2, virtual router 42A executes within hypervisor 40, also often referred to as a virtual machine manager (VMM), which provides a virtualization platform that allows multiple operating systems to concurrently run on one of servers 26. In the example of FIG. 2, virtual router 42A manages virtual networks 46, each of which provides a network environment for execution of one or more virtual machines (VMs) 48 on top of the virtualization platform provided by hypervisor 40. Each VM 48 is associated with one of the virtual networks VN0-VN1 and represents tenant VMs running customer applications such as Web servers, database servers, enterprise applications, or hosting virtualized services used to create service chains. In some cases, any one or more of servers 26 or another computing device hosts customer applications directly, i.e., not as virtual machines. Virtual machines as referenced herein, e.g., VMs 48, servers 26, or a separate computing device that hosts a customer application may be referred to alternatively as "hosts."

In general, each of VMs 48 may be any type of software application and is assigned a virtual address for use within a corresponding virtual network 46, where each of the virtual networks may be a different virtual subnet provided by virtual router 42A. A VM 48 may be assigned its own virtual layer three (L3) IP address, for example, for sending and receiving communications, but is unaware of an IP address of the physical server 26A on which the virtual machine is executing. In this way, a "virtual address" is an address for an application that differs from the logical address for the underlying, physical computer system, e.g., server 26A in the example of FIG. 2. The virtual addresses may also be referred to herein as "virtual interfaces."

In one implementation, each forwarding component 49 of servers 26 includes a corresponding VR agent 36 that communicates with SDN controller 32 and, responsive thereto, directs virtual router 42 so as to control the overlay of virtual networks 46 and coordinate the routing of data packets within server 26. In general, each VR agent 36 communicates with SDN controller 32, which generates commands to control routing of packets through data center 10. Each of VR agents 36 may send messages to SDN controller 32 over XMPP sessions, the messages conveying virtual routes to the virtual interfaces (virtual addresses) of the VMs of servers 26. SDN controller 32 receives the messages and stores the virtual routes, and may in turn advertise one or more of the virtual routes from a first VR agent 36 to other VR agents 36. In some examples, any of the virtual routes may include a prefix, a next hop address associated with a server of servers 26, and a label or other data to identify a virtual routing and forwarding instance configured at the next hop server. A virtual route may include a Route Distinguisher (RD).

In one example, VR agents 36 execute in user space and operate as a proxy for control plane messages between VMs 48 and SDN controller 32. For example, a VM 48 may request to send a message using its virtual address via the VR agent 36A, and VR agent 36A may in turn send the message and request that a response to the message be received for the virtual address of the VM 48 that originated the first message. In some cases, a VM 48 invokes a procedure or function call presented by an application programming interface of VR agent 36A, and the VR agent 36A handles encapsulation of the message as well, including addressing.

In some example implementations, each forwarding component 49 of server 26A further includes an orchestration agent (not shown in FIG. 2) that communicates directly with orchestration engine 30. For example, responsive to instructions from orchestration engine 30, the orchestration agent communicates attributes of the particular VMs 46 executing on the respective server 26, and may create or terminate individual VMs.

In one example, network packets, e.g., layer three (L3) IP packets or layer two (L2) Ethernet packets generated or consumed by the instances of applications executed by virtual machines 48 within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed within virtual routers 42, e.g., within the hypervisor or the host operating system running on each of servers 26. As another example, encapsulation and decapsulation functions are performed at the edge of switch fabric 21 at a first-hop top-of-rack (TOR) switch 24 that is one hop removed from the application instance that originated the packet. This functionality is referred to herein as tunneling and may be used within data center 10 to create one or more overlay networks. Besides IP-in-IP, other example tunneling protocols that may be used include IP over GRE, VxLAN, MPLS over GRE, MPLS over UDP, etc.

As noted above, SDN controller 32 provides a logically centralized controller for facilitating operation of one or more virtual networks within data center 10. For example, SDN controller 32 maintains a routing information base, e.g., one or more routing tables that store routing information for the physical network as well as one or more overlay networks of data center 10. Similarly, chassis switches 22, TOR switches 24 and virtual routers 42 maintain routing information, such as one or more routing and/or forwarding tables. In one example implementation, virtual router 42A of hypervisor 40 implements a network forwarding table (NFT) 44 for each virtual network 46. In general, each NFT 44 stores forwarding information for the corresponding virtual network 46 and identifies where data packets are to be forwarded and whether the packets are to be encapsulated in a tunneling protocol, such as with a tunnel header that may include one or more headers for different layers of the virtual network protocol stack.

For example, virtual machine VM1-48 may send an "inner packet," to virtual router 42A by an internal link. Virtual router 42A uses NFT1 to look up a virtual network destination network address for the packet. NFT1 specifies an outbound interface for virtual router 42A and encapsulation for the packet. Virtual router 30A applies the encapsulation to add a tunnel header to generate an outer packet and outputs the outer packet on the outbound interface, in this case toward TOR switch 24A.

The routing information, for example, maps packet key information (e.g., destination IP information and other select information from packet headers) to one or more specific next hops within the networks provided by virtual routers 42 and switch fabric 21. In some case, the next hops are chained next hops that specify a set of operations to be performed on each packet when forwarding the packet, such as may be used for flooding next hops and multicast replication. As shown in FIG. 2, each virtual network 46 provides a communication framework for encapsulated packet communications for the overlay network established through switch fabric 21. In this way, network packets associated with any of virtual machines 48 may be transported as encapsulated packet communications via the overlay network.

According to the techniques of the disclosure, virtual router 42A of forwarding component 49A performs session-based monitoring and logging of network flow and traffic statistics. In one example, virtual router 42A of forwarding component 49A processes forward traffic flows 50A forwarded by virtual router 42A and reverse traffic flows 50B forwarded by virtual router 42A to generate traffic flow statistics for the traffic flows 50A-50B. In some examples, the traffic flow statistics for each flow include a five-tuple (e.g., a protocol, a source address, a source port, a destination address, and a destination port), a count of the packets forwarded for the flow, and/or a count of bytes forwarded for the flow. Virtual router 42A periodically communicates the generated traffic flow statistics to VR agent 36A such that VR agent maintains a similar record of the traffic flow statistics for traffic flowing through virtual router 42A.

VR agent 36A processes the generated traffic flow statistics to identify pairs of ingress traffic flows and egress traffic flows that correspond to a common communication session between one or more VMs 48. In one example, VR agent 36A identifies pairs of ingress traffic flows 50A and egress traffic flows 50B that correspond to a common communication session. In one example, VR agent processes the traffic statistics generated by virtual router 40 to compare a protocol, a source address, a source port, a destination address, and a destination port (e.g., a five-tuple) of each sampled ingress packet flow and each egress packet flow. For example, if a first ingress flow 50A has the same protocol as a first egress flow 50B, if the source address and source port of the first ingress flow 50A are the same as the destination address and the destination port of the first egress flow 50B, and if the destination address and the destination port of the first ingress flow 50A are the same as the source address and source port of the first egress flow 50B, then VR agent 36A determines that the first ingress flow 50A and the first egress flow 50B correspond to a common communication session between two devices. However, if a second ingress flow 50A does not have the same protocol as a second egress flow 50B, or if the source address and source port of the second ingress flow 50A are not the same as the destination address and the destination port of the second egress flow 50B, or if the destination address and the destination port of the second ingress flow 50A are not the same as the source address and source port of the second egress flow 50B, then VR agent 36A determines that the second ingress flow 50A and the second egress flow 50B do not correspond to a common communication session between two devices.

For each identified pair of ingress and egress traffic flows, VR agent 36A generates session-based records of traffic statistics for the network traffic forwarded by virtual router 42A. In other words, VR agent 36A generates records of traffic statistics for the network traffic forwarded by virtual router 42A, wherein each record includes traffic statistics that pertain to a common communication session between two devices, and includes traffic statistics for an ingress traffic flow and an egress traffic flow for the common communication session.

In some examples, VR agent 36A generates such session-based records of traffic statistics for each traffic flow received by virtual router 42A. In other examples, VR agent 36A generates session-based records of traffic statistics for only a subset of the traffic flows received by virtual router 42A to generate session-based records of traffic statistics for a subset of the traffic flowing through virtual router 42A. In some examples, the subset of the traffic flows is selected at random. In yet further examples, the subset of the traffic flows is selected according to an algorithm to provide a statistically accurate representation of the traffic flows received by virtual router 42A. In some examples, VR agent 36A receives, from controller 32, an indication of one or more traffic flows that comprise the subset for which to generate the session-based records of traffic statistics.

In one example, a single session-based record 52 may include a number of "diff bytes" for both the ingress flow and egress flow associated with the session. Such "diff bytes" describe a number of bytes received for the ingress flow and a number of bytes received for the egress flow during the previous monitoring period (e.g., the difference in bytes between the end of the previous monitoring period and the end of the current monitoring period). Further, the session-based record 52 may include additional network flow and traffic statistics information, such as the total number of bytes forwarded for both the ingress flow and egress flow, an uptime both the ingress flow and egress flow, address, port and forwarding information associated with each of the ingress flow and egress flow, etc.

VR agent 36A uploads the session-based record 52 to traffic collector 34 which, in this example, is a component of SDN controller 32. In some examples, VR agent 36A periodically uploads a group of session-based records 52 generated during the previous sampling period (e.g., VR agent uploads the group of session-based records 52 to traffic collector 34 approximately once per second, once per minute, or once per day). Traffic collector 34 writes session-correlated network flow and traffic statistics information for the session record 52 into analytics database 35. Thus, because both the forward and reverse flows 50A, 50B are described with respect to a single session 52, a system as described herein requires fewer index tables to describe the traffic statistics information in analytics database 35. Thus, such a system may reduce the number of writes to analytics database 35 required for each traffic statistics operation. Further, such a system may avoid a complex series of index tables that a system that performs flow-based monitoring may require to match a record for a forward flow with a corresponding record of a reverse flow.

The architecture of data center 10 illustrated in FIG. 2 is shown for purposes of example only. The techniques as set forth in this disclosure may be implemented in the example data center 10 of FIG. 2, as well as other types of data centers not described specifically herein. Nothing in this disclosure should be construed to limit the techniques of this disclosure to the example architecture illustrated by FIG. 2.

Figure 3:
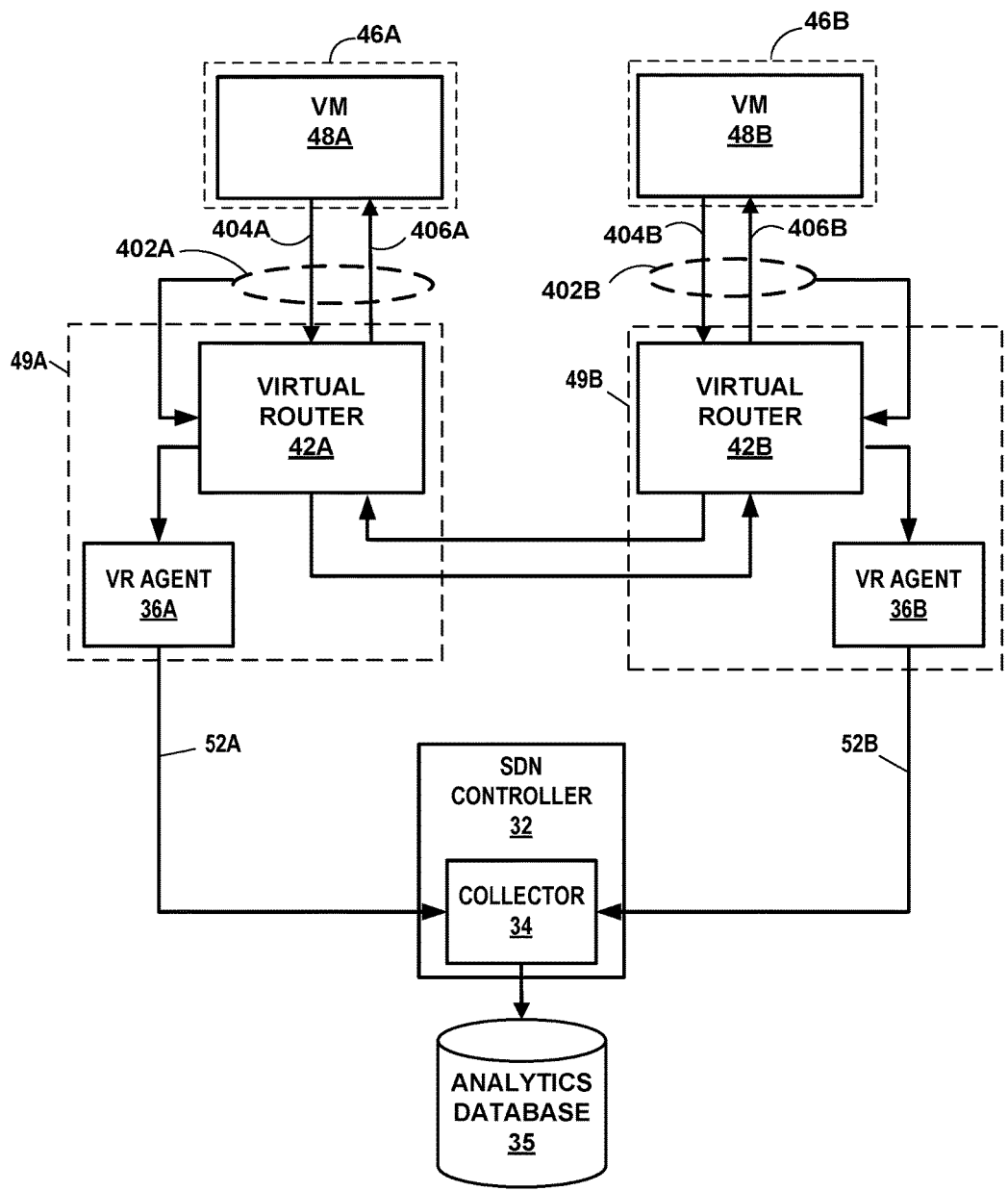
FIG. 3 is a block diagram illustrating an example system for performing session-based monitoring and logging of traffic flowing between virtual routers.

FIG. 3 is a block diagram illustrating an example system for performing session-based monitoring and logging of traffic flowing between virtual routers 48. As depicted in FIG. 3, a VM 48A belonging to a first Virtual Network (VN)

60A establishes a network session with a second VM 48B belonging to a second VN 46B for communication of network traffic via network paths established between a first virtual router 42A of a first forwarding component 49A and a second virtual router 42B of a second forwarding component 49B.

According to the techniques of the disclosure, virtual router 42A of forwarding component 49A performs session-based traffic monitoring and logging of traffic for the session between VM 48A and VM48B by processing forward flows 404A of traffic flowing through virtual router 42A and reverse flows 406A of traffic flowing through virtual router 42A to generate traffic flow statistics for the traffic flowing through virtual router 42A. Virtual router 42A communicates the traffic flow statistics for traffic flows 404A-404B to VR agent 36A.

VR agent 36A generates session-based records of traffic statistics by processing the traffic flow statistics to identify pairs of ingress traffic flows and egress traffic flows that correspond to a common communication session between one or more VMs 48, e.g., between VM 48A and VM 48B. For example, VR agent 36A identifies pairs of ingress traffic flows 406A and egress traffic flows 404A that correspond to a common communication session by comparing a protocol, a source address, a source port, a destination address, and a destination port (e.g., a five-tuple) of each sampled ingress flow and each egress flow, as described above with respect to FIG. 2. In the example of FIG. 3, VR agent 36A determines that an ingress traffic flow 406A and egress traffic flow 404A correspond to a common communication session 402A between VM 48A and VM 48B.

For each identified pair of ingress and egress traffic flows, VR agents 36 generate session-based records of traffic statistics for the network traffic forwarded by the corresponding virtual router 42. In some examples, the traffic statistics include a number of outbound bytes associated with a forward flow 404 and forwarded by virtual router 42, as well as a number of inbound bytes associated with a reverse flow 406 and forwarded by virtual router 42. In some examples, the number of outbound and inbound bytes is a number of number of outbound and inbound bytes forwarded since VR agent 36 previously uploaded session-based records of the traffic statistics to traffic collector 34.

Thus, each session-based record is a single record of information associated with a session 402 that includes information associated with each traffic flow 404A, 406A. Thus, for the session between VM 48A and VM 48B, only 2 session records are created and uploaded to traffic collector 34 (e.g., traffic statistics for session 402A and traffic statistics for session 402B). Further, traffic collector 34 may write each session record to only 2 index tables of analytics database 35. In other words, such a system as described herein may consolidate traffic statistics into a single 2-index table having a first index for a source of traffic flow and a second index for a destination of traffic flow. This allows traffic collector 34 to make only 4 writes to the analytics database 35 (e.g., 2 records*2 indexes), achieving a significant increase in speed and decrease in resource consumption over traffic statistics systems that perform flow-based monitoring.

In contrast, a system that performs flow-based monitoring and logging may require the creation and uploading of 4 separate records (e.g., traffic statistics for inbound flow 404A of virtual router 42A, traffic statistics for outbound flow 406A of virtual router 42A, traffic statistics for inbound flow 404B of virtual router 42B, and traffic statistics for outbound flow 406B of virtual router 42B). Further, a system that performs flow-based monitoring and logging may index each of these four records against 5 flow series tables (e.g., one index table for each tuple of the five-tuple associated with a common communication session) and one FlowRecordTable (e.g., the traffic statistics information itself), which may necessitate 24 writes to a database (e.g., 4 records*6 indexes). Thus, a system 5 that performs session-based monitoring and logging as described herein may achieve a significant increase in speed and decrease in resource consumption over traffic statistics systems that perform flow-based monitoring and logging.

As described herein, the "source" of the traffic is considered to be the ingress side with respect to virtual router 42, while the "destination" of the traffic is considered to be the egress side with respect to virtual router 42. As described herein, data is transmitted with respect to the ingress flow such that a record key for the analytics database 35 matches the ingress flow. In some examples, the following record key may be used:

Source Network-VN1, Source IP-IP1, Source Port-port1, Dest. Network-VN2, Dest IP-IP2, Dest Port-port2

Virtual router 42 transmits, to VR agent 36, the foregoing record key for the traffic information as well as the record of session 402 (e.g., the combined records for forward flow 404 and reverse flow 406). In some examples, virtual router 42 transmits two samples, a first sample for ingress traffic and a second sample for egress traffic, wherein both the first sample and the second sample are associated with the same record key. Additionally, virtual router 42 associates a forward flag or a reverse flag for each sample. The forward flag indicates that ingress traffic caused the flow to be established, while the reverse flag indicates that egress traffic to be established. Note that the forward and reverse flags are independent of the ingress and egress traffic.

As described herein, new data structures for implementing such session-based traffic monitoring are described. A first data structure, FlowData, describes information associated with a particular flow. A second data structure, SessionData, combines two FlowData data structures (e.g., an ingress flow record and an egress flow record) and includes a flag indicating whether forward (e.g., ingress) traffic or reverse (e.g., egress traffic) caused the flow to be established, as described above.

One example such a FlowData data structure for describing data associated with a flow of traffic between one or more virtual routers is described below:

```
struct FlowData {
    1: string flowuuid;
    2: i64 diff_bytes;
    3: i64 diff_packets
}
```

One example of such a SessionData data structure for describing data associated with an ingress flow of traffic and an egress flow of traffic between one or more virtual routers is described below:

```
Struct SessionData {
    1: FlowData ingress;
    2: FlowData egress;
    /* Below fields are common can be sent once */
    3: bool is_ingress_flow_forward;
    4: string ingress_source_virtual_network;
    5: string ingress_source_IP_address;
    6: string ingress_destination_virtual_network;
```

```
    7: string ingress_destination_IP_address;
    8: byte ingress_protocol;
    9: i16 ingress_source_port;
    10: i16 ingress_destination_port;
    11: bool local_flow;
}
```

Because the SessionData data structure includes information describing both the ingress flow of traffic and the egress flow of traffic through the virtual router, several fields required systems that perform flow-based monitoring are redundant and may be combined. For example, such a SessionData data structure requires only a single instance of the SourcEVN, DestVN, SourceIP, and DestIP fields. Consolidating such fields allows saving resources over systems that perform flow-based monitoring.

In some examples, for local flows, virtual router 42 converts two flow records into a single session record (e.g., a single SessionData data structure). For example, with respect to the example of FIG. 3, VM 48A communicates with virtual router 42A in a first virtual network, VM 48B communicates with virtual router 42B in a second virtual network, and both VMs 48A, 48B reside within the same compute note. In this example, VR agents 48A, 48B may transmit only the ingress flow session records to traffic collector 34. In such an implementation, both FlowData data structures of a SessionData data structure correspond to ingress flows. Using a flag local_flow, traffic collector 34 may extrapolate egress flow record information.

In some examples, VR agent 36 sends the collected information for the session to traffic collector 34. Traffic collector 34 stores a database entry, such as a JSON entry, in the analytics database 35. The database entry includes all fields of the SessionData data structure describing the session-based record. Such a system may permit backwards compatibility such that flow-based queries and session-based queries to analytics database 35 return accurate records for both flow information and session information, respectively.

Figure 4:
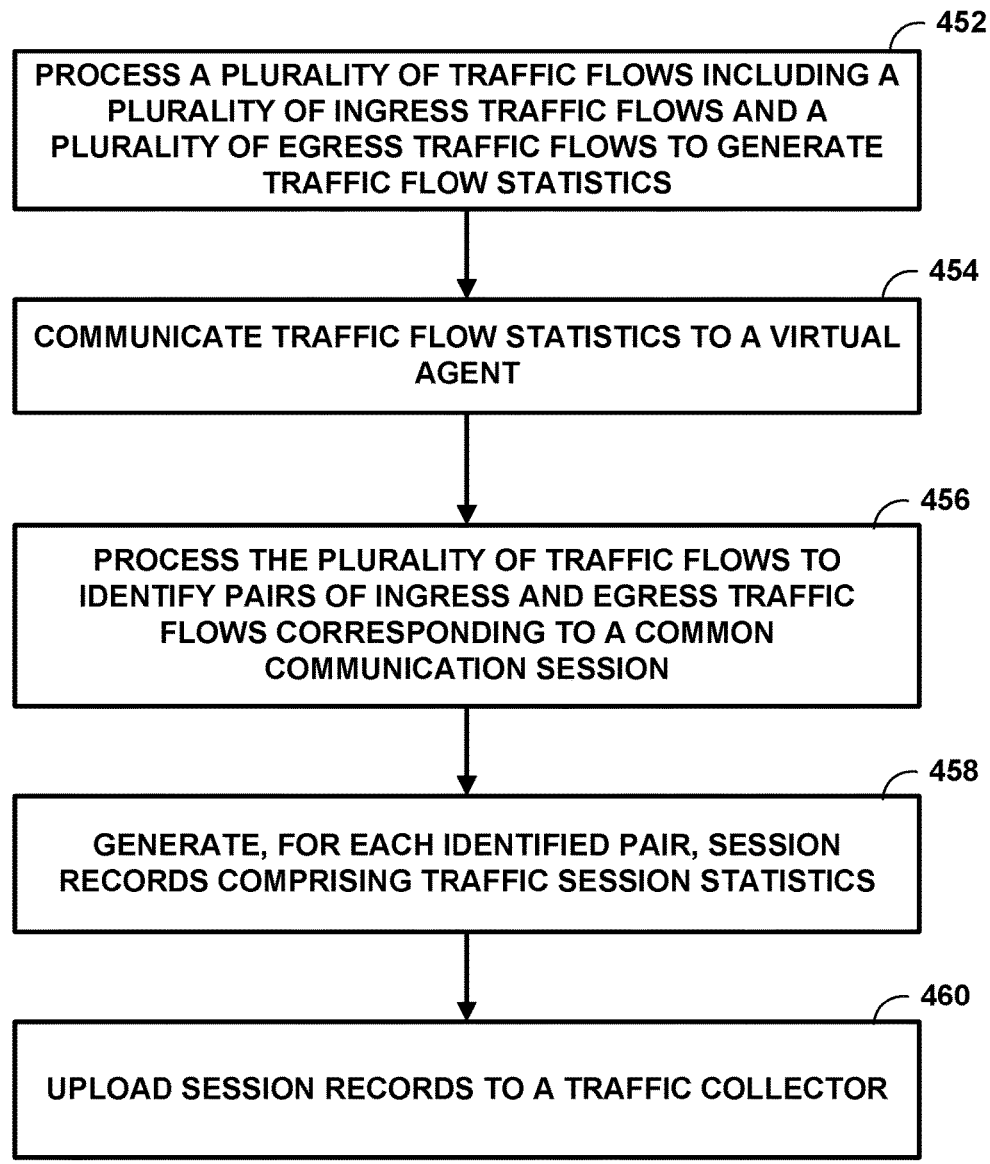
FIG. 4 is a flowchart illustrating an example operation for performing session-based monitoring and logging of traffic in accordance with the techniques of the disclosure.

FIG. 4 is a flowchart illustrating an example operation for performing session-based monitoring and logging of traffic in accordance with the techniques of the disclosure. For convenience, FIG. 4 is described with respect to forwarding component 49A of FIGS. 1 and 2. In one example, virtual router 42A of forwarding component 49A is configured to forward network traffic to and from VMs 48. Virtual router 42A processes a plurality of traffic flows for VMs 48 to generate traffic flow statistics (452). The plurality of traffic flows that virtual router 42A processes include a plurality of ingress traffic flows originating from VMs 48 and destined for a network of cloud data center 10. For example, the destination network may include a customer network accessible through service provider network 6 or a virtual network 46 established by one of virtual routers 46B-46N executing on one of servers 26B-26N. The plurality of traffic flows that virtual router 42A processes further include a plurality of egress traffic flows originating from the network of the cloud data center and destined for VMs 48.

Virtual router 42A communicates the traffic flow statistics to VR agent 46A executing in a user space of server 26A (454). VR agent 46A of forwarding component 49A processes the traffic flow statistics to identify pairs of the plurality of ingress traffic flows and the plurality of egress traffic flows corresponding to a common communication session for the VMs 48 (456). In one example, VR agent 46A compares a 5-tuple of an ingress traffic flow with a 5-tuple of an egress traffic flow to determine whether the ingress and egress traffic flows correspond to the common communication session. VR agent 46A generates, for each of the identified pairs of the plurality of ingress traffic flows and the plurality of egress traffic flows, session records comprising traffic session statistics for the respective one of the plurality of ingress traffic flows and the respective one of the plurality of egress traffic flows of the pair (458). Further, VR agent 46A uploads the session records to traffic collector 34 (460).

Traffic collector 34 stores these session-based records in analytics database 35 for use by an administrator of the cloud data center. Such a system as described herein may require fewer index tables to store the network flow statistics and traffic monitoring information, and thus require fewer write operations to record traffic statistics for each network session than a system that records traffic statistics on a per-flow basis. Thus, such a system for performing session-based monitoring and logging of network flow and traffic statistics may operate more efficiently and quickly than if traffic statistics were performed on a per-flow basis alone.

Figure 5:
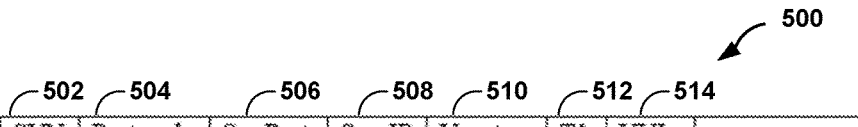
FIG. 5 is a block diagram of an example source index table of a database for storing session-based traffic statistics in accordance with the techniques of the disclosure.

FIG. 5 is a block diagram of an example source index table 500 of analytics database 35 for storing session-based traffic analytics in accordance with the techniques of the disclosure. Source index table 500 includes an SVN field 502, a SOURCE IP field 508, a T1 field 512, and a UUID field 514. According to the techniques of the disclosure, source index table 500 additionally includes a PROTOCOL field 504, a SOURCE PORT field 506, and a VROUTER field 510.

In some examples, the schema of source index table 500 is the following:

```
{
    'table_name' : FLOW_TABLE_SRC,
    'columns' : [
        { 'name' : 'T2',
            'key': true},
        { 'name' : Partition Key',
            'key': true},
        { 'name' : ' Direction ', /* ingress or egress */
            'key': true},
        { 'name' : Source Virtual Network'},
        { 'name' : 'Source Protocol'},
        { 'name' : 'Source Port'},
        { 'name' : Source IP Address'},
        { 'name' : 'Virtual Router'},
        { 'name' : 'T1',
        { 'name' : 'Session UUID',
        { 'name' : 'JSON representation of session information fields'},
    ]
}
```

Figure 6:
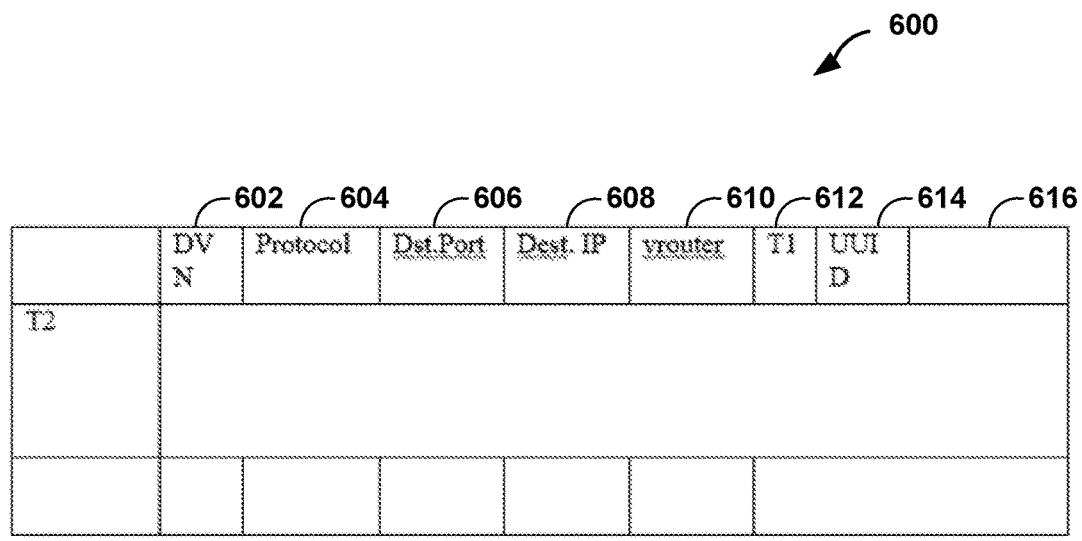
FIG. 6 is a block diagram of an example destination index table of a database for storing session-based traffic statistics in accordance with the techniques of the disclosure.

FIG. 6 is a block diagram of an example destination index table 600 of analytics database 35 for storing session-based traffic statistics in accordance with the techniques of the disclosure. Destination index table 600 includes an DVN field 602, a DESTINATION IP field 608, a T1 field 612, and a UUID field 614. According to the techniques of the disclosure, destination index table 600 additionally includes a PROTOCOL field 604, a DESTINATION PORT field 606, and a VROUTER field 610.

In some examples, the schema of destination index table 600 is the following:

```
{
    'table_name' : FLOW_TABLE_DESTN,
    'columns' : [
        { 'name' : 'T2',
            'key': true},
        { 'name' : 'Partition Key',
            'key': true},
        { 'name' : 'Direction ', /* ingress or egress */
            'key': true},
        { 'name' : ' Destination Virtual Network '},
        { 'name' : ' Destination Protocol'},
        { 'name' : 'Destination Port'},
        { 'name' : "Destination IP Address"},
        { 'name' : 'Virtual Router'},
        { 'name' : 'T1', },
        { 'name' : 'Session UUID', },
        { 'name' : 'JSON representation of session information
            fields', },
    ]
}
```

FIGS. 7A-7B are block diagrams of an example source index table 700 and an example destination index table 750 for analytics database 35 for storing session-based traffic statistics in accordance with the techniques of the disclosure.

According to the techniques of the disclosure, source index table 700 and destination index table 750 permit queries to obtain session information at various points in time without no loss of information with respect to the individual flows described by each session. With respect to FIG. 7A, source index table 700 describes a plurality of entries after receiving a first session record 702A and a second session record 702B from a VR agent 36. With respect to FIG. 7B, destination index table 700 describes a plurality of entries parallel to that of source index table 700 after receiving the first session record 702A and the second session record 702B.

Network (SVN) or a Destination Virtual Network (DVN), one of a Source IP Address (SIP) and a Destination IP Address (DIP), and one direction of an Ingress and an Egress (802). Analytics database 35 determines whether the query specifies an SVN and an Ingress direction (804). If the query specifies an SVN and an Ingress direction (e.g., "YES" block of 804), analytics database 35 applies the query as an ingress key of the source index table 700 (806) and returns the session-based traffic statistics corresponding to the query.

If the query does not specify an SVN and an Ingress direction (e.g., "NO" block of 804), analytics database 35 determines whether the query specifies an SVN and an Egress direction (808). If the query specifies an SVN and an Egress direction (e.g., "YES" block of 808), analytics database 35 applies the query as an egress key of the source index table 700 (810) and returns the session-based traffic statistics corresponding to the query.

If the query does not specify an SVN and an Egress direction (e.g., "NO" block of 808), analytics database 35 determines whether the query specifies a DVN and an Ingress direction (812). If the query specifies a DVN and an Ingress direction (e.g., "YES" block of 812), the analytics database 35 applies the query as an ingress key of the destination index table 750 (814) and returns the session-based traffic statistics corresponding to the query.

If the query does not specify a DVN and an Ingress direction (e.g., "NO" block of 812), analytics database 35 swaps the key and applies the query as an egress key of the source index table 700 (816) and returns the session-based traffic statistics corresponding to the query.

Thus, given one of an SVN and DVN, one of a SIP and a DIP, and one direction (D) of an Ingress and an Egress, a query may return flow-based traffic statistics information. The following examples illustrate queries to source index table 700 and destination index table 750, and the resulting expected flow-based traffic statistics information:

| | | | |
|---|---|---|---|
| SVN = VN 46A, | SIP = VM 48A, | D = Ingress | (Expected record: 404A) |
| SVN = VN 46A, | SIP = VM 48A, | D = Egress | (Expected record: 406B) |
| DVN = VN 46A, | DIP = VM 48A, | D = Ingress | (Expected record: 404B) |
| DVN = VN 46A, | DIP = VM 48A, | D = Egress | (Expected record: 404A) |
| SVN = VN 46B, | SIP = VM 48B, | D = Ingress | (Expected record: 404B) |
| SVN = VN 46B, | SIP = VM 48B, | D = Egress | (Expected record: 404A) |
| DVN = VN 46B, | DIP = VM 48B, | D = Ingress | (Expected record: 404A) |
| DVN = VN 46B, | DIP = VM 48B, | D = Egress | (Expected record: 406B) |

Figure 8:
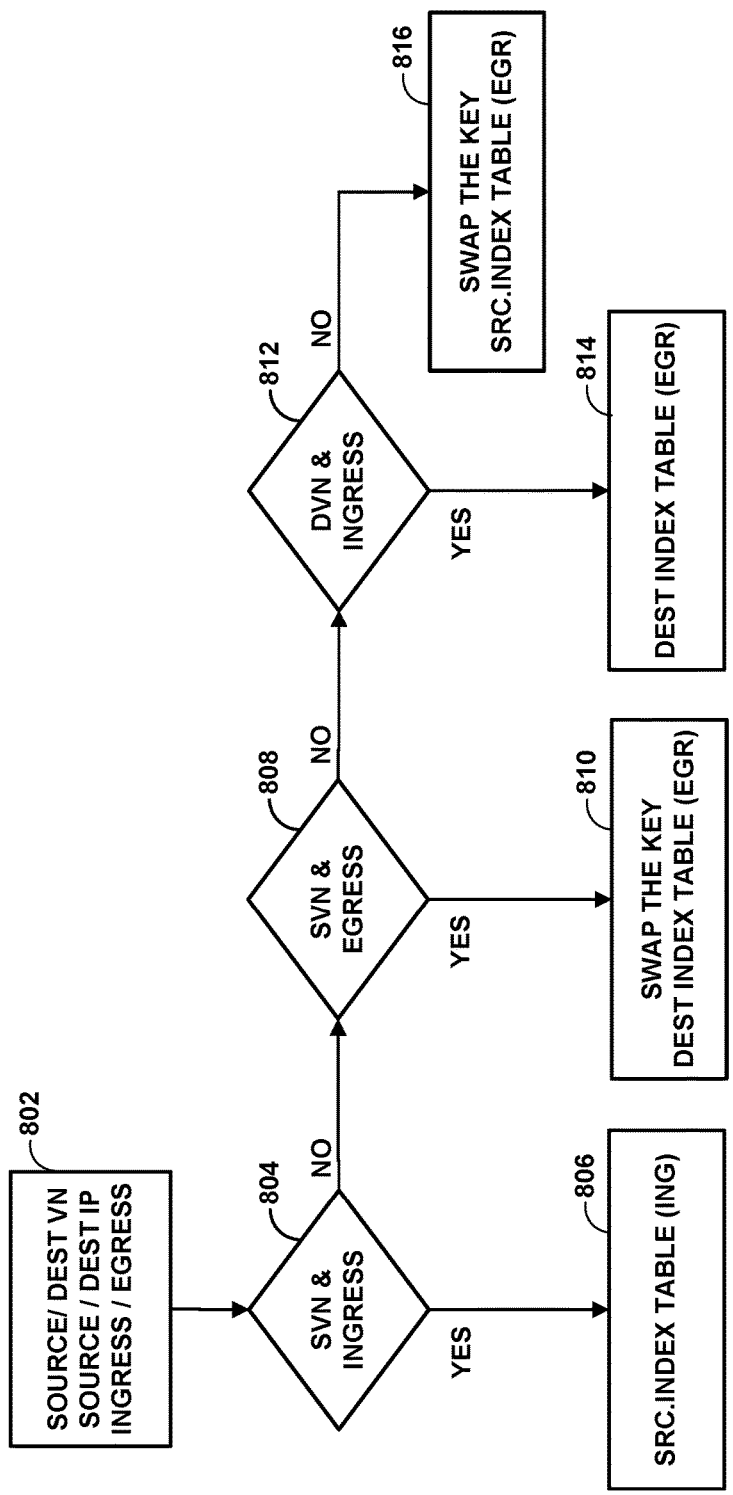
FIG. 8 is an example flowchart illustrating an operation for querying a database for session-based traffic statistics records.

FIG. 8 is an example flowchart illustrating an operation for querying analytics database 35 for session-based traffic statistics records. FIG. 8 is described with respect to the example system of FIG. 3 and the example source index table 700 and example destination index table 750 of FIGS. 7A-7B.

Upon querying source index table 700 and destination index table 750, the query specifies a direction of traffic (e.g., an ingress or an egress). The flowchart of FIG. 8 illustrates how the querying logic of analytics database 35 operates and provides information on which of source index table 700 and destination index table 750 to query and which field to use while querying. Because the techniques described herein modify the number of flow index tables within analytics database 35, modified lookup queries to analytics database 35 are described.

According to the techniques of the disclosure, analytics database 35 receives a query for session-based traffic statistics, wherein the query includes one of a Source Virtual As described herein, any WHERE query which does not have an OR unit with an SVN or a DVN is handled differently because such a query requires fetching all the SVN or DVN and is not supported by Cassandra Query Language (CQL). For example, queries in which there are OR units not conditioned on SVN or DVN may require a different path. Such queries are referred to herein as '* query processing.' If a query is identified as a '* query', only a single database lookup is necessary. The different conditions specified in the WHERE query are evaluated against the results fetched. This eliminates the repeated reads that otherwise may be involved. Examples of such queries are described below:

Example 1

SELECT * FROM SourceIndexTable WHERE vrouter='a6s9';

Example 2

SELECT * FROM SourceIndexTable WHERE (SVN=VN 46A AND SIP=VM 48A) OR (vrouter='a6s9')

In contrast, all other queries may use secondary indices. Such other queries follow a regular query execution path of making database calls per AND condition. An example of such other queries is described below:

Example 1

SELECT * FROM FlowSeriesTable WHERE (SVN=VN 46A AND SIP=VM 48A) OR (DVN=VN 46B AND SIP=VM 48B)

A query may be determined to be a '* query' after a QueryPrepare step. Currently, the QueryPrepare step checks for syntactic correctness of a query. Changes may be made to the QueryPrepare step to determine whether a query is a '*query'. Upon identifying the query as a '*query', the system creates a pipeline that performs the query against the source index table or destination index table and stores the results of the query for each chunk. At the point where the individual WHERE conditions of the query are executed, the system spawns an inner pipeline to execute the database call only if the query is a '* query.' In case of a '* query,' the system uses the results already fetched against the chunk and evaluates the conditions of the '* query.'

When trying to match conditions specified in a WHERE clause of a query, the system reads the values of the database entry that are returned because the columns of the database entry may not include all required information. For example, consider the following query:

SELECT * FROM SourceIndexTable WHERE (SVN=VN 46A AND SIP=VM 48A) OR (vrouter='a6s9') OR (DVN=VN 46B AND DIP=VM 48B)

This query qualifies as a '* query' against the SourceIndexTable. However, to evaluate the third OR condition, the system reads the value of the database entry because the SourceIndexTable may not have DVN or DIP information in the corresponding column name. It is anticipated that using these fields as column names may result in large rows.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A method comprising:
processing, by a virtual router executing on a processor of a server within a cloud data center, a plurality of traffic flows for one or more virtual machines executing on the server within the cloud data center to generate traffic flow statistics for the plurality of traffic flows, wherein the plurality of traffic flows include:
a plurality of ingress traffic flows originating from the one or more virtual machines and destined for a network of the cloud data center; and
a plurality of egress traffic flows originating from the network of the cloud data center and destined for the one or more virtual machines;
processing the traffic flow statistics to identify pairs of the plurality of ingress traffic flows and the plurality of egress traffic flows corresponding to a common communication session for the one or more virtual machines;
generating, for each of the identified pairs of the plurality of ingress traffic flows and the plurality of egress traffic flows, session records comprising traffic session statistics for the common communication session corresponding to the respective one of the plurality of ingress traffic flows and the respective one of the plurality of egress traffic flows of the pair; and
uploading the session records to a traffic collector for the network of the cloud data center.

2. The method of claim 1, wherein processing the traffic flow statistics to identify pairs of the plurality of ingress traffic flows and the plurality of egress traffic flows corresponding to a common communication session for the one or more virtual machines comprises:
communicating the traffic flow statistics to a virtual agent executing in a user space of the server; and
processing the traffic flow statistics with the virtual agent.

3. The method of claim 1, wherein uploading the session records to the traffic collector for the network of the cloud data center comprises uploading the session records to the traffic collector of a Software-defined Networking (SDN) controller for the network of the cloud data center.

4. The method of claim 1,
wherein the traffic flow statistics include a count of ingress bytes for each of the plurality of ingress traffic flows and a count of egress bytes for each of the plurality of egress traffic flows, each of the traffic session statistics for the common communication session corresponding to the respective one of the plurality of ingress traffic flows and the one of the plurality of egress traffic flows of the pair include the count of ingress bytes for the respective one of the plurality of ingress traffic flows and the count of egress bytes for the respective one of the plurality of egress traffic flows.

5. The method of claim 1,
wherein, for each of the plurality of ingress traffic flows and plurality of egress traffic flows corresponding to a common communication session, the traffic session statistics include a protocol, a source address, a destination address, a source port, and a destination port of the traffic flow, and
wherein processing the traffic flow statistics to identify pairs of the plurality of ingress traffic flows and the plurality of egress traffic flows corresponding to a common communication session for the one or more virtual machines comprises comparing the protocol, the source address, the destination address, the source port, and the destination port of the respective one of the plurality of ingress traffic flows of the pair with the protocol, the source address, the destination address, the source port, and the destination port of the respective one of the plurality of egress traffic flows of the pair.

6. The method of claim 5, wherein comparing the protocol, the source address, the destination address, the source port, and the destination port of the respective one of the plurality of ingress traffic flows of the pair with the protocol, the source address, the destination address, the source port, and the destination port of the respective one of the plurality of egress traffic flows of the pair comprises determining whether an ingress traffic flow of the plurality of ingress traffic flows and an egress traffic flow of the plurality of egress traffic flows share a protocol, whether a source address and a source port of the ingress flow is the same as a destination address and a destination port of the egress flow, and whether a destination address and a destination port of the ingress flow is the same as a source address and a source port of the egress flow.

7. The method of claim 1, wherein uploading the session records to the traffic collector for the network of the cloud data center comprises uploading the session records to the traffic collector for the network of the cloud data center after a predetermined amount of time.

8. The method of claim 7, wherein the predetermined amount of time is approximately one minute.

9. A method comprising:
receiving, by a traffic collector for a network of a cloud data center and from a virtual routing agent executing on a processor of a server within the cloud data center, session records comprising traffic session statistics for common communication sessions corresponding to pairs of traffic flows and for the one or more virtual machines, and wherein the traffic session statistics for each common communication session for the session records includes traffic session statistics for an ingress traffic flow of a respective pair and originating from one or more virtual machines and destined for a network of the cloud data center, and traffic session statistics for an egress traffic flow of the respective pair and originating from the network of the cloud data center and destined for the one or more virtual machines; and
storing, by the traffic collector, the session records in an analytics database.

10. The method of claim 9, wherein the analytics database comprises a source index table and a destination index table.

11. The method of claim 10, wherein storing the session records in the analytics database comprises, for each of the session records:
writing, by the traffic collector, the traffic session statistics for each pair of traffic flows to the source index table; and
writing, by the traffic collector, the traffic session statistics for each pair of traffic flows to the destination index table.

12. The method of claim 11, wherein, for each ingress traffic flow or egress traffic flow of the session records, the traffic session statistics include a protocol, a source address, a destination address, a source port, and a destination port of the traffic flow.

13. The method of claim 12, wherein writing the traffic session statistics for each common communication session to the source index table comprises writing, for each pair of traffic flows corresponding to the common communication session, the protocol, the source address, and the source port for the respective ingress traffic flow of the pair and the protocol, the source address, and the source port for the respective egress traffic flow of the pair to the source index table, and
wherein writing the traffic session statistics for each common communication session to the destination index table comprises writing, for each pair of traffic flows corresponding to the common communication session, the protocol, the destination address, and the destination port for the respective ingress traffic flow of the pair and the protocol, the destination address, and the destination port for the respective egress traffic flow of the pair to the destination index table.

14. The method of claim 9, wherein storing the session records in the analytics database comprises, for each of the session records, storing the session records in the analytics database in no more than two write operations.

15. The method of claim 9, further comprising:
receiving, by the analytics database, a query for traffic session statistics for a first pair of traffic flows of the pairs of traffic flows; and
providing, in response to the query, the traffic session statistics for the first pair of traffic flows of the pairs of traffic flows.

16. The method of claim 15, wherein the query comprises a virtual network, an IP address, and a direction.

17. The method of claim 16,
wherein the virtual network of the query is one of a Source Virtual Network (SVN) of the one or more virtual machines or a Destination Virtual Network (DVN) of the network of the cloud data center,
wherein the IP address is one of a Source IP Address (SIP) of the one or more virtual machines or a Destination IP Address (DIP) of the network of the cloud data center, and
wherein the direction is one of an ingress of the one or more virtual machines or an egress of the network of the cloud data center.

18. A forwarding component executing on a processor of a server within a cloud data center configured to:
process, by a virtual router of the forwarding component, a plurality of traffic flows for one or more virtual machines executing on the server within the cloud data center to generate traffic flow statistics for the plurality of traffic flows, wherein the plurality of traffic flows include:

a plurality of ingress traffic flows originating from the one or more virtual machines and destined for a network of the cloud data center; and a plurality of egress traffic flows originating from the network of the cloud data center and destined for the one or more virtual machines;

process the traffic flow statistics to identify pairs of the plurality of ingress traffic flows and the plurality of egress traffic flows corresponding to a common communication session for the one or more virtual machines;

generate, for each of the identified pairs of the plurality of ingress traffic flows and the plurality of egress traffic flows, session records comprising traffic session statistics for the common communication session corresponding to the respective one of the plurality of ingress traffic flows and the respective one of the plurality of egress traffic flows of the pair; and upload the session records to a traffic collector for the network of the cloud data center.

19. The forwarding component of claim 18, wherein, to process the traffic flow statistics to identify pairs of the plurality of ingress traffic flows and the plurality of egress traffic flows corresponding to the common communication session for the one or more virtual machines, the forwarding component is further configured to:

communicate, by the virtual router of the forwarding component, the traffic flow statistics to a virtual agent of the forwarding component executing in a user space of the server; and process the traffic flow statistics with the virtual agent.

20. The forwarding component of claim 18, wherein the traffic flow statistics include a count of ingress bytes for each of the plurality of ingress traffic flows and a count of egress bytes for each of the plurality of egress traffic flows, each of the traffic session statistics for the common communication session corresponding to the respective one of the plurality of ingress traffic flows and the one of the plurality of egress traffic flows of the pair include the count of ingress bytes for the respective one of the plurality of ingress traffic flows and the count of egress bytes for the respective one of the plurality of egress traffic flows.

21. A traffic collector for a network of a cloud data center configured to:

receive, from a forwarding component executing on a processor of a server within the cloud data center, session records comprising traffic session statistics for common communication sessions corresponding to pairs of traffic flows and for the one or more virtual machines, and wherein the traffic session statistics for each common communication session for the session records includes traffic session statistics for an ingress traffic flow of a respective pair and originating from one or more virtual machines and destined for a network of the cloud data center, and traffic session statistics for an egress traffic flow of the respective pair and originating from the network of the cloud data center and destined for the one or more virtual machines; and store the session records in an analytics database.

22. The traffic collector of claim 21, wherein the analytics database comprises a source index table and a destination index table, and wherein, to store the session records in the analytics database, the traffic collector is further configured to, for each of the session records:

write the traffic session statistics for each pair of traffic flows to the source index table; and write the traffic session statistics for each pair of traffic flows to the destination index table.

23. The traffic collector of claim 21, wherein, for each ingress traffic flow or egress traffic flow of the session records, the traffic session statistics include a protocol, a source address, a destination address, a source port, and a destination port of the traffic flow, wherein, to write the traffic session statistics for each common communication session to the source index table, the traffic collector is further configured to write, for each pair of traffic flows corresponding to the common communication session, the protocol, the source address, and the source port for the respective ingress traffic flow of the pair and the protocol, the source address, and the source port for the respective egress traffic flow of the pair to the source index table, and wherein, to write the traffic session statistics for each common communication session to the destination index table, the traffic collector is further configured to write, for each pair of traffic flows corresponding to the common communication session, the protocol, the destination address, and the destination port for the respective ingress traffic flow of the pair and the protocol, the destination address, and the destination port for the respective egress traffic flow of the pair to the destination index table.

* * * * *